United States Patent
Spiga et al.

(10) Patent No.: US 7,717,022 B2
(45) Date of Patent: May 18, 2010

(54) GUILLOTINE SHEARS FOR SHEET METAL

(75) Inventors: Mauro Spiga, Castelmaggiore (IT); Guy Boissin, Weiningen (CH); Roland Krebs, Fraubrunnen (CH)

(73) Assignee: Soudronic AG, Bergdietikon (CH)

( * ) Notice: Subject to any disclaimer, the term of this patent is extended or adjusted under 35 U.S.C. 154(b) by 81 days.

(21) Appl. No.: 11/660,897

(22) PCT Filed: Aug. 15, 2005

(86) PCT No.: PCT/CH2005/000473

§ 371 (c)(1),
(2), (4) Date: May 22, 2007

(87) PCT Pub. No.: WO2006/021112

PCT Pub. Date: Mar. 2, 2006

(65) Prior Publication Data

US 2008/0295667 A1 Dec. 4, 2008

(30) Foreign Application Priority Data

Aug. 24, 2004 (CH) ...................................... 1389/04

(51) Int. Cl.
*B23D 15/08* (2006.01)

(52) U.S. Cl. ............................... 83/568; 83/613; 83/694

(58) Field of Classification Search .................... 83/566, 83/568, 583, 613, 615, 694
See application file for complete search history.

(56) References Cited

U.S. PATENT DOCUMENTS

| 191,112 | A | * | 5/1877 | Chase | 83/613 |
| 3,073,201 | A | * | 1/1963 | Thumim | 83/647.5 |
| 3,757,621 | A | | 9/1973 | Breetvelt | 83/157 |
| 2003/0192414 | A1 | * | 10/2003 | Farassat | 83/694 |

FOREIGN PATENT DOCUMENTS

| DE | 23 11 873 A1 | 9/1974 |
| DE | 30 15 913 A1 | 10/1981 |
| GB | 2233925 | * 1/1991 |

OTHER PUBLICATIONS

International Search Report of PCT/CH2005/000473 dated Oct. 25, 2005.

* cited by examiner

*Primary Examiner*—Stephen Choi
(74) *Attorney, Agent, or Firm*—McCormick, Paulding & Huber LLP

(57) ABSTRACT

A guillotine shears for sheet metal is provided with two knife carriers movable relative to one another along a working stroke. The knife carriers are connected with one another through at least two leaf spring arrangements. The elastic deformation region of the leaf spring arrangements determines the maximum range of the relative movement.

18 Claims, 2 Drawing Sheets

GUILLOTINE SHEARS FOR SHEET METAL

REFERENCE TO RELATED APPLICATION

This application claims the priority of PCT Patent Application PCT/CH2005/000473 filed Aug. 15, 2005 and Swiss Patent Application Nr. 1389/04, which was filed on 24 Aug. 2004, the entire disclosures of which are incorporated herewith by reference.

BACKGROUND OF THE INVENTION

The present invention concerns a guillotine shears in which two knife carriers are connected with one another through at least two leaf spring arrangements.

STATE OF THE ART

Guillotine shears for sheet metal are in very common use. According to the length of the cut to be created considerable pressing forces for the knife are needed, even in the case when the cut is slightly inclined to the top surface of the sheet metal. The highest pressing forces are required when the knife in oriented parallel to the top surface of the sheet material. Since the cut occurs by shearing of the sheet metal, because of the displacement of the material during the cut considerable other forces occur which force the knife blades away from one another as they slide past each other. These forces are unavoidable even in the case of small cutter clearance and increase such clearance.

Often, but not always, guillotine shears are so constructed that sheet metal strips or sheet metal plates are positioned on a horizontal advancement surface and are moved along that surface toward the knives. The knives which are arranged transversally, and usually perpendicularly, to the advancement direction open and close at timed intervals, with the strips (or plates) to be cut being moved forwardly during the open position of the knives for the next cut. Usually (but not always) the lower knife is arranged rigidly in the frame of the guillotine shears, while the upper knife raises and lowers to carry out its working stroke, that is it opens and closes and thereby executes the cut.

Increasing the quality of the cut to be made requires higher construction demands, such as sufficient stiffness of the frame of the guillotine shears, sufficient rigid arrangement of the lower knife in the frame, or, especially, the precise and support of the upper knife without free play throughout its entire working stroke, especially for the cutting portion of the stroke.

In many applications, especially in the field of making sheet metal containers, like, among other things, welded sheet metal cans, the required cut quality is high. On one hand during the cutting itself, for example in the case of brewing, clean alignment of the cut means tolerances over the entire length of the cut lying in the region of tenths of a millimeter or less. Without the exact maintenance of such tolerances the subsequent work processes can not be carried out in a fault free manner. This applies in the welding of the subsequently rounded sheet into a body or during flanging of the bottom or top into the body, so that eventually the finished can or the finished sheet container is created.

In regard to this cut quality it must also be taken into consideration that in a manufacturing line a mass production undertaking is often carried out, which requires a working rate which is high and which above all is interrupted as little as possible over a long time, up to as much as a three operational shifts.

Conventional guillotine shears of the mentioned kind accordingly for a long time have been equipped with an expensive support for the moveable knife carrier (in the case of the above described widespread construction; the upper knife carrier). Widely used is a support of the movable knife carrier on four columns, which are arranged at the ends or corners of the knife carrier, that is by way of a so called column frame. A cylindrical ball cage with balls runs up and down on each of the columns, with the bearing support location of the knife carrier consisting on one hand of the cage and the balls so that by way of these the knife carrier can move up and down on the columns. Advantages of such a support is its load capacity and its precision; disadvantages are the necessary adjustment work as well as the wear. Especially in the case of mass production the interruption of production for repeated adjustment or replacement of a column frame on the basis of wear is problematic. Moreover during the production run with regard to the limit of wear there arises a gray zone where the cutting quality for avoidance of operational interruption has not yet occurred but actually is no longer what it should be.

SUMMARY OF THE INVENTION

The object of the invention is to provide a guillotine shears which avoids the above-mentioned disadvantages.

This object is solved by connecting the two knife carriers with one another through at least two leaf spring arrangements.

In this arrangement, since the knife carriers are connected with one another through leaf spring arrangements, there is obtained a reduced relative movement of the knife carriers relative to one another. The leaf springs are bendable along their length, and are possibly twistable, but are not bendable about the small edge of the leaf and instead are stiff in that direction.

In this arrangement, since the elastic deformation region of the leaf spring arrangements corresponds to the maximum region of the relative movement, that is, the maximum working stroke, there remains no room for other movement of the knife carriers in regard to the working stroke, independently of an eventual additional support of the knife carrier.

Finally a leaf spring arrangement, once correctly dimensioned, need not (or cannot) be adjusted; and it is also free of wear.

In other words by using leaf spring arrangements, column frames for example can be replaced, so that wear and adjustment work on a guillotine shears according to the invention is accordingly reduced.

Proceeding from the given object, a preferred embodiment provides an entirely wear-free and adjustment-free support of the movable knife carrier, since this carrier is floatingly suspended on at least two leaf spring arrangements whose deformation region entirely defines the path of the relative movement, that is the path of the working stroke, with no other or additional support of the movable knife carrier being necessary.

BRIEF DESCRIPTION OF THE DRAWINGS

Preferred embodiments of the invention are described in the following with the help of the drawings.

The drawings are.

DETAILED DESCRIPTION OF THE INVENTION

Figure 1:
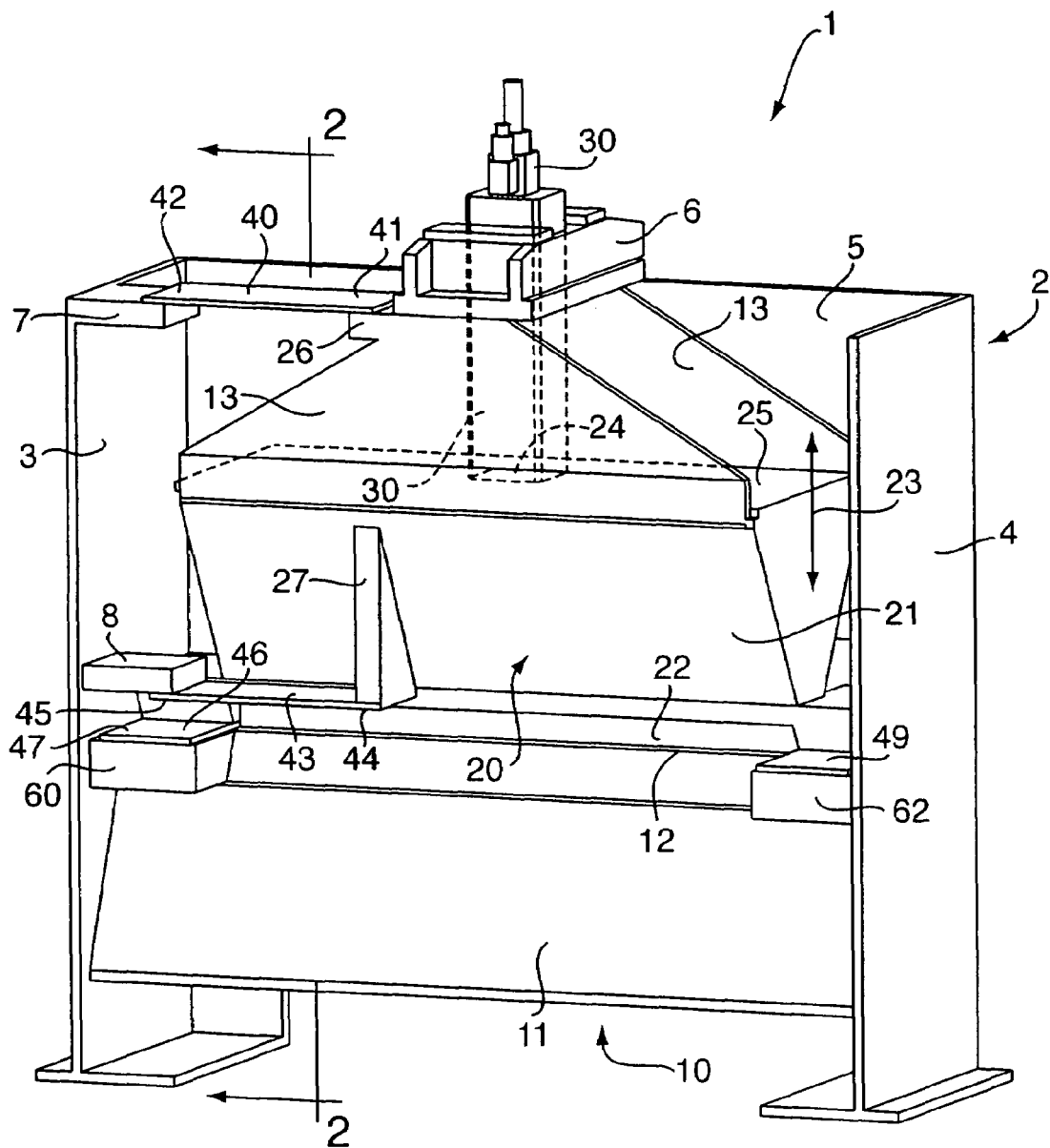
FIG. 1—A view of a guillotine shears according to the invention looking in the advancement direction of the sheet metal plate or sheet metal strip to be cut, and FIG. 2—A cross-section taken through the guillotine shears of FIG. 1 along the section line 2-2 of FIG. 1.

FIG. 1 is a three-dimensional view of a guillotine shears 1 embodying the invention and having a frame structure 2 including side pieces 3 and 4 and a rear wall 5. A forward wall of the frame structure 2 is omitted to reveal interior details. The direction of view into the interior of the guillotine shears 1 corresponds to the advancement direction of a sheet strip or a sheet plate to be cut. Likewise, for illustration purposes, omitted from the figure is a table and the associated means for stepwise advancement of the sheet material, which table and associated advancement means can be of a conventional type.

The side pieces 3 and 4 contain between themselves a lower knife carrier 10 connected with the side pieces 3, 4; that is, the knife carrier 10 is rigidly supported by the side pieces 3, 4. The knife carrier 10 has a body 11 with a box-like, here essentially triangular, hollow cross-section and it carries a lower knife 12.

Figure 2:
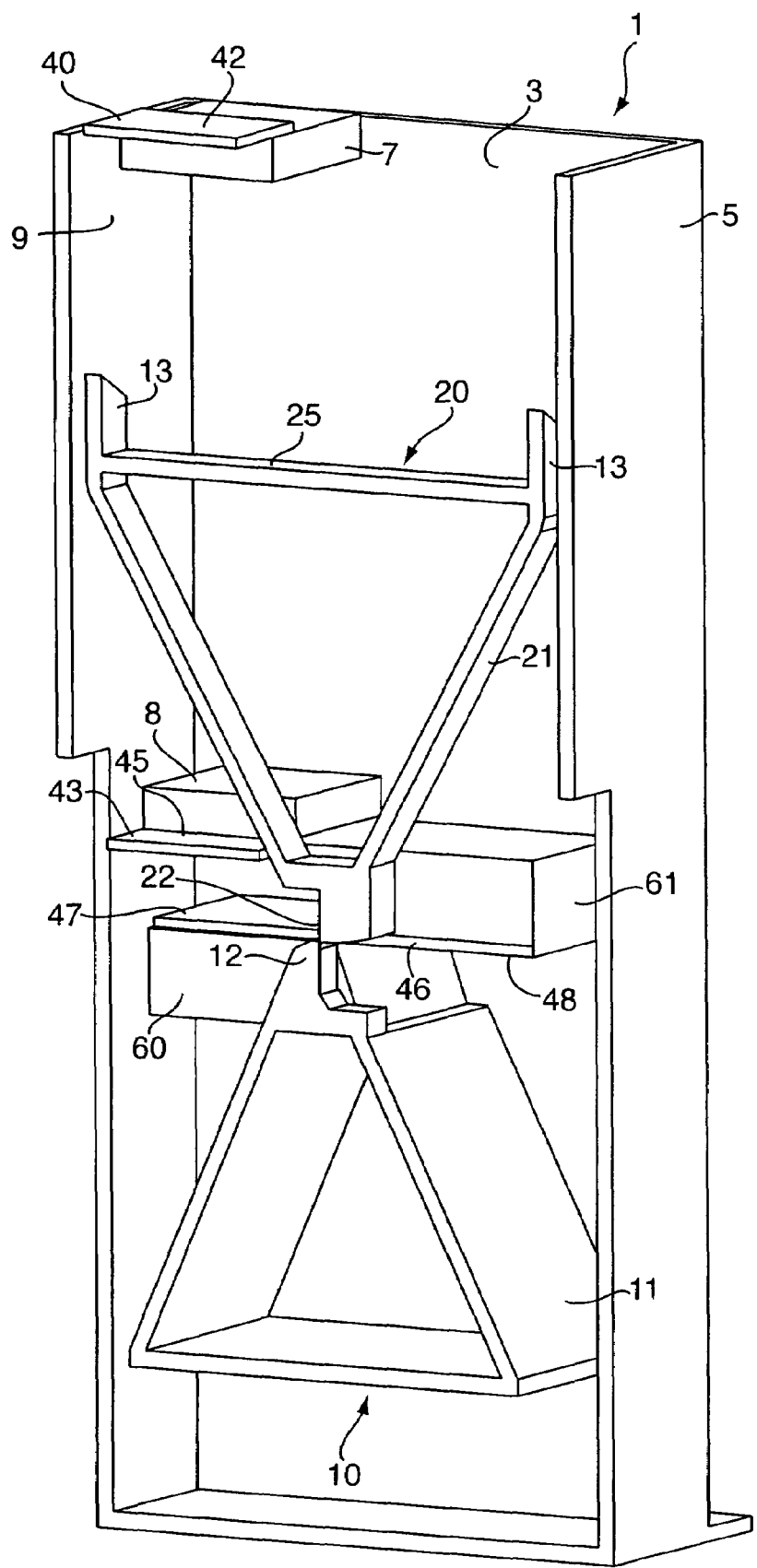

An upper knife carrier 20 includes a body 21 likewise having a box-like (triangular) hollow cross-section, and it carries an upper knife 22 (FIG. 2). The upper-knife carrier 20 is arranged above the lower knife carrier 10 and is movably supported in the frame structure 2 so that it can execute an up and down movement toward and away from the lower knife carrier 10. This movement corresponds on one hand to the working stroke (indicated by the double-arrow 23) of the knife carrier 20 for the cutting of a piece of sheet metal, and on the other-hand corresponds to the relative movement between the moveable knife carrier 20 and the fixedly arranged knife carrier 10.

The working stroke is effected by the vertically arranged hydraulic cylinder 30 part of a drive of a conventional kind, (not more clearly illustrated), for the knife carrier 20, which drive on one side is fixed to a bridge 6 of the frame structure 2 and on the other side works on a force introduction spot 24 of a boundary wall 25 of the box-like profile of the knife carrier 20.

The figure also shows a leaf spring arrangement formed as a leaf spring 40, a leaf spring arrangement formed as a leaf spring 43, and, partially visible, leaf spring arrangements formed as a leaf spring 46 and leaf spring 49, respectively.

The upper knife carrier 20 is suspended in a floating manner on the leaf springs 40, 43, 46 and 49.

The leaf springs 40, 43 extend parallel to the knife carrier 20. The leaf springs 46, 49 run perpendicularly to the knife carrier 20 and perpendicularly to its working stroke 23.

The leaf springs 40, 43, 46 and 49 lie in parallel planes. The leaf springs 46, 49 lie in a common plane. The leaf springs 40, 43 lie in a common plane.

The leaf spring 40 at its one end 41 is connected with the body 21 of the upper knife carrier 20 by way of a connecting element 26 which is arranged on a stiffening rib 13 of the body 21 and which has a fastening surface for the end 41. The other end 42 of the leaf spring 40 is connected to the side piece 3 by way of a bracket 7 and thereby is affixed to the frame structure 2 (and accordingly also fixed relative to the lower knife carrier 10, which itself is fixed to the side piece 3). The leaf spring 43 is similarly arranged, having its one end 44 fixed to the body 21 of the knife carrier 20 by way of its own rib-like connecting element 27 and having its other end 45 rigidly connected to the side piece 3 (and to the knife carrier 10) by a bracket 8.

The leaf springs of 40, 43 are rigidly connected with their brackets 7, 8 and with the connecting elements 26, 27, for example by way of threaded connectors or welding, so that they bend into S-shapes or step-shapes when the working stroke 23 is carried out.

It will be understood, that the leaf springs of 40, 43 are bendable upwardly or downwardly out of their neutral planes, that is in the vertical direction, but are not bendable about their small edges, that is in the horizontal direction. The knife carrier 20 is therefore so supported that it is horizontally fixed and can be moved vertically.

Therefore this arrangement represents a parallel movement suspension of the knife carrier 20, wherein the elastically deformable regions of the leaf springs 40, 43 determine the maximum range of the relative movement between the knife carriers 10, 20. Further because of the illustrated arrangement of the leaf springs 40, 43 only a movement of the knife carrier 20 in the direction of the working stroke 23 is permitted; that is, by way of the illustrated, floating suspension of the knife carrier 20 on the leaf springs 40, 43, the path of the relative movement between the knife carriers 10, 20 is completely defined.

Furthermore, it is seen that the two knife carriers 10, 20 are connected with one another through the leaf springs 40, 43, with the side piece 3, the brackets 7, 8, as well as the connecting elements 26, 27, being components of the connection.

Further connecting elements or brackets 60, 62 of the lower knife carrier 10 serve as fastening points for the leaf springs 46, 49, as is explained in more detail in the following with reference to FIG. 2.

FIG. 2 shows a cross-section through the guillotine shears of FIG. 1 taken on the section line 2-2 with the viewing direction being toward the side piece 3. Therefore in this figure the side piece 3 as well as the rear wall 5 and the forward wall 9 of the frame structure 2 is visible (the forward wall 9 having been omitted in FIG. 1).

Likewise visible in FIG. 2 is the lower knife carrier 10 with its body 11, which is formed with a box-like essentially triangular hollow cross-section, and the lower knife 12. The upper knife 22 is arranged on the bottom of the likewise essentially triangular hollow profiled body 21 of the upper knife carrier 20.

Further illustrated are the brackets of 7, 8 as well as the ends 41, 42, of the leaf springs 40, 43 fastened to them.

At the illustrated end of the lower knife carrier 10 (that is, its end adjacent the side piece 3) is horizontally arranged a connecting element or bracket 60, which preferably is rigidly connected likewise with the side piece 3, and thus can be considered to be a bracket, and without connection with the side wall 3 is a connecting element. Arranged on the illustrated end of the upper, movable knife carrier 20 is a connecting arm 61 forming a connecting element, likewise horizontal, which extends from the bracket 60 (or connecting element 60). According to the design of the frame structure 2 a person skilled in the art can provide either a bracket 60 or a connecting element 60.

The leaf spring 46 common to the two knife carriers 10, 20 is at one of its ends 47 fixed to the bracket 60 and at its other end 48 to the connecting arm 61. Since the bracket 60 and the connecting element 61 move relative to one another, the leaf spring 46 has a considerable length.

One the other side, that is in the vicinity of the side piece 4, the knife carriers 10, 20 are connected in the same way, as shown in the vicinity of the side piece 3, by their common leaf spring 49. The suspension of the knife carrier 20 by way of the leaf springs 46, 49 is formed identically at both side pieces 3, 4.

In operation, using the guillotine shears 1 of the present invention preferably (but not exclusively) sheet metal or sheet metal strips of a width between 500 to 1200 mm, and a thickness from 0.08 to 1.5 mm, preferably 0.12 to 0.4 mm, are cut. The cutting gap then amounts to, for example, 0.10 mm and the necessary pressing force can reach to 10 to 13 t or more.

With the mentioned thickness of the sheet to be cut the working stroke can be limited to a few mm, for example to three to five mm. The hydraulic cylinder 30 applies the cutting pressure and shifts the knife carrier 22 to its lower end point. If the hydraulic cylinder 30 is double acting it produces a reverse movement of the knife carrier 20. That is, it likewise lifts up the knife carrier. If the hydraulic carrier 30 is only single acting the knife carrier 20 is lifted by the leaf springs 40, 43, 46 and 49 back to its upper dead point.

The working stroke is produced by the movement of the knife carriers 10, 20 relative to and from one another, indeed by the flexing of the leaf springs 40, 43, 46 and 49, or the shifting of their ends 41, 42; 44, 45; 47, 48 and 50, 51.

In the case of a working stroke, the brackets 60, 62 remain at rest and connecting elements 61, move up and down in an arc (which because of the S-shaped deformation of the leaf springs 46, 49 is not exactly a circular arc). The "radius" of this arc is given by the length of the leaf springs 46, 49. The larger the length of the leaf springs 46, 49 is made for a given working stroke 23, the smaller becomes of the needed horizontal shifting of the knives 12, 22 as a result of the arc-shaped movement, that is, the smaller becomes the associated change in the cutting gap during the working stroke.

On the other hand this change in the cutting gap can be minimized by choosing to have the brackets 60, 62 and the connecting elements 61, positioned as far as possible from one another, which leads to a large length for the leaf springs of 46, 49 (and therefore a large arc radius). On the other hand this change of the cutting gap can be used to advantage. If the leaf springs 46, 49 are arranged slightly elevated, so that they already at the beginning of the cutting process diminish the cutting gap, there results a certain restriction of the previously mentioned effect whereby the knives 12, 22 during the cutting process are driven horizontally from one another by the elastic deformation of the frame structure 2 and of the knife carriers 10, 20, which is beneficial to the quality of cut.

Taking into account the cutting parameters and the provided material, a person skilled in the art can determine the length of the leaf springs 46, 49 as well as their exact height with respect to the knives 10, 12 and thereby, as described above, desirably influence the cutting gap and its change during a cut.

The arc-shaped movement of the knife 10 during the working stroke 23 has the further result that the leaf spring 40 is slightly torqued. The leaf spring 43 however resists this torsion (and against the arc-shaped movement of the knife 10). The suspension of the knife carrier 20 in the illustrated way, including the leaf spring 43, is statically over-defined and appears to be impermissible.

If now leaf springs having considerable length, for example 500 mm are used and a working stroke of 4 mm is assumed, the horizontal shifting of the knives 12, 22, or the change in the cutting gap, amounts to 0.005 mm. As tests have shown, this leads only, but not always, to an oppositely sided tensioning of the leaf springs 40, 43, 46, 49 during the cutting process which because of the exact guiding of the knives 10, 12 effected by the tensioning is likewise beneficial to the cut quality.

It has been shown that advantageously leaf springs are used whose width is ten times, preferably fifteen times, and more especially sixteen times, their thickness. Moreover their length advantageously has a value which is at least equal to their width, and preferably is two times their width, and more especially is two and a half times their width.

As mentioned in the description of FIG. 1, by way of the floating suspension of the knife carrier 20 on the leaf springs 40, 43 a sufficient guiding is already provided to achieve the necessary cut quality. An improved support of the knife carrier 20 results from its suspension on leaf springs 46, 49 transverse to the knife carrier 20 and additionally to the leaf spring 40 parallel to the knife carrier 20.

Finally the cut quality can still further be positively influenced in that a fourth leaf spring 43, likewise parallel to the knife carrier 20, is provided, which corresponds to the preferred embodiment shown in FIGS. 1 and 2.

In a further embodiment it is possible to provide four leaf springs, which are all arranged parallel to one another and each of which has the configuration of the leaf springs 46, 49 shown in FIGS. 1 and 2. Then the knife carrier 20 is guided at its four corners and moves in translation up and down along the working stroke 23.

In keeping with the invention at least two, but also alternatively three or four or more than four leaf springs, can be used for the suspension of the knife carrier 20. An arrangement of the leaf springs actually used parallel or perpendicular to the knife carrier 20, as well as the number of springs used, is derived from the cutting parameters and from the needed cut quality.

Also, for example, the leaf springs 40, 43 instead of being arranged on the same side of the knife carrier 10 can be arranged on different sides of it. So far as influencing the way in which the leaf springs of 40, 43 are tensioned, the same may be applied to leaf springs 46, 49.

The inventive way of using leaf springs is not limited to one embodiment in the case of which the lower knife carrier 10 is rigid and only the upper knife carrier 20 is movable. So long as a relative movement of the knife carriers 10, 20 takes place by way of inventively used leaf springs, that means that the knife carriers 10, 20 are connected with one another by way of leaf springs, the object of the present invention is basically solved.

In the case of a still further embodiment (which is not shown in the figures) the leaf spring arrangements are not connected with their one ends to one of the knife carriers and with their other ends to the other knife carrier, but instead have both ends connected to one knife carrier and by way of the spring body with the other knife carrier. Then these leaf spring arrangements are endwise so anchored with respect to the one knife carrier that in the rest position they are arc-shaped and the spring path (that is the working stroke 23) takes place toward and away from the anchoring. By such an arrangement a strictly linear working stroke 23 is achieved. If such an arrangement is used in place of that illustrated in FIGS. 1 and 2 where the knife carriers 10, 20 are connected through the leaf springs 46, 49, the tensioning of the leaf springs 40, 43 naturally disappears, which again, depending on the cutting parameters and the materials, can be desirable (or not). Naturally in the case of such leaf spring arrangements (with both ends anchored to one knife carrier) it lies within the scope of the invention to not use the arrangement of the leaf springs 40, 42 shown in FIGS. 1 and 2, but as above mentioned to arrange all four leaf spring arrangements parallel to one another.

In the case of the embodiment according to FIGS. 1 and 2 the leaf spring arrangements are shown as individual leaf springs, but also spring packages made of stacked leaf springs or some other configuration of assembled leaf springs can be used, so long as they provide the functions of the leaf springs 40, 43, 46 and 49 illustrated in FIGS. 1 and 2.

As above described, should one choose to deviate from the number, configuration and arrangement of the leaf spring arrangements in the preferred embodiment illustrated in FIGS. 1 and 2 because of special cutting parameters or special materials or otherwise special requirements, a person skilled in the art can easily determine the best solution at hand by tests.

While in the present application preferred embodiments of the invention have been described, it is to be clearly understood that the invention is not limited to these embodiments and can also be carried out in other ways within the boundaries of the following claims.

The invention claimed is:

1. A guillotine shears for sheet metal with two knife carriers movable relative to one another along a working stroke, comprising:
   a frame structure comprising at least one side piece;
   a lower knife carrier rigidly connected to the at least one side piece and aligned in a longitudinal direction; and
   an upper knife carrier movably supported for performing the working stroke and co-aligned in the longitudinal direction of the lower knife carrier;
   wherein the knife carriers are connected with one another by way of at least three leaf spring arrangements;
   wherein at least two leaf spring arrangements are aligned parallel to one another in a common plane, and at least one leaf spring arrangement is aligned perpendicular to the at least two leaf spring arrangements in a plane that is parallel to the common plane;
   wherein the at least two leaf spring arrangements extend perpendicular to the longitudinal direction of the knife carriers, and the at least one leaf spring arrangement extends in the longitudinal direction of the knife carriers;
   wherein each of the at least three leaf spring arrangements is connected at one end to the lower knife carrier and connected at the other end to the upper knife carrier; and
   wherein the elastic deformation region of the at least three leaf spring arrangements determines the maximum range of the relative movement of the knife carriers.

2. The guillotine shears according to claim 1, wherein the upper knife carrier is floatably suspended by the at least three leaf spring arrangements; and
   wherein the elastic deformation regions of the at least three leaf spring arrangements entirely define the path of the relative movement of the knife carriers.

3. The guillotine shears according to claim 1, wherein the at least two leaf spring arrangements are aligned perpendicular both to the longitudinal direction of the knife carriers and to the direction of the working stroke.

4. The guillotine shears according to claim 1, wherein the at least one leaf spring arrangement is aligned parallel to the longitudinal direction of the knife carriers and perpendicular to the direction of the working stroke.

5. The guillotine shears according to claim 4, wherein the at least one leaf spring arrangement is connected with one knife carrier by way of its end and with the other knife carrier by way of its body, so that the knife carriers are movable toward and away from one another by the resilient shifting of these connecting points.

6. The guillotine shears according to claim 1, wherein the upper knife carrier and the lower knife carrier are movable toward and away from one another by the oppositely directed spring-defined shifting of the ends of the at least three leaf spring arrangements.

7. The guillotine shears according to claim 6, wherein the connections of the ends of the at least three leaf spring arrangements to the associated knife carriers are formed rigidly, so that the deformation of the three leaf spring arrangements is an S-shape.

8. The guillotine shears according to claim 6, wherein at least one knife carrier has a body made of a box-shaped hollow cross-section, and
   wherein the at least three leaf spring arrangements are connected to the at least one knife carrier through a connecting element arranged rigidly on the body.

9. The guillotine shears according to claim 1, wherein at least one knife carrier comprises a body made of a box-shaped hollow cross-section and is connected with the at least three leaf spring arrangements through a connecting element arranged rigidly on the body.

10. The guillotine shears according to claim 1, wherein at least one knife carrier comprises a connecting element formed as a connecting arm; and
    wherein the at least two leaf spring arrangements are connected to the connecting arm, with the connecting arm separating the at least two three leaf spring arrangements from one another by a large distance.

11. The guillotine shears according to claim 1, wherein the at least one leaf spring arrangement is rigidly connected to the upper knife carrier and to the at least one side piece.

12. The guillotine shears according to claim 11, wherein the knife carriers are connected to one another by four leaf spring arrangements.

13. The guillotine shears according to claim 12, wherein two of the four leaf spring arrangements are aligned parallel to one another, with each of the two leaf spring arrangements having one end arranged at one end of the knife carriers and aligned perpendicular to the longitudinal direction and perpendicular to the working stroke; and
    wherein the other two of the four leaf spring arrangements are aligned parallel to the longitudinal direction and are rigidly connected with the upper knife carrier and with the at least one side piece serving as a connecting element.

14. The guillotine shears according to claim 12, wherein the four leaf spring arrangements are provided in pairs, with one pair of said four leaf spring arrangements aligned parallel to the longitudinal direction, and the other pair aligned perpendicular to the longitudinal direction and perpendicular to the working stroke.

15. The guillotine shears according to claim 1, wherein the knife carriers are connected to one another by four leaf spring arrangements.

16. The guillotine shears according to claim 1, wherein at least one of the at least three leaf spring arrangements is formed as a single leaf spring.

17. The guillotine shears according to claim 16, wherein each of the at least three leaf spring arrangements has a width which exceeds its thickness by at least ten times.

18. The guillotine shears according to claim 16, wherein each of the leaf spring arrangements has a length which exceeds its width by at least two times.

* * * * *